United States Patent [19]

Suzuki

[11] Patent Number: 5,310,385

[45] Date of Patent: * May 10, 1994

[54] OIL-OPERATED TENSIONER WITH OIL-SEALED AIR ENTRANCE

[75] Inventor: Tadasu Suzuki, Higashimurayama, Japan

[73] Assignee: Tsubakimoto Chain Co., Osaka, Japan

[*] Notice: The portion of the term of this patent subsequent to Sep. 28, 2010 has been disclaimed.

[21] Appl. No.: 989,337

[22] Filed: Dec. 11, 1992

[30] Foreign Application Priority Data

Dec. 12, 1991 [JP] Japan ................... 3-109511

[51] Int. Cl.$^5$ ............................... F16H 7/08
[52] U.S. Cl. ...................... 474/110; 474/138
[58] Field of Search ............... 474/110, 103, 104, 107, 474/110, 111, 138, 140

[56] References Cited

U.S. PATENT DOCUMENTS

| | | | |
|---|---|---|---|
| 4,911,680 | 3/1990 | Kodama et al. | 474/110 X |
| 4,997,410 | 3/1991 | Polster et al. | 474/138 X |
| 4,997,411 | 3/1991 | Breon et al. | 474/138 X |
| 5,167,402 | 12/1992 | Nakakubo et al. | 474/110 X |
| 5,181,889 | 1/1993 | Maruyama et al. | 474/138 X |
| 5,234,383 | 8/1993 | Harada et al. | 474/138 X |
| 5,248,282 | 9/1993 | Suzuki | 474/138 X |

OTHER PUBLICATIONS

U.S. patent application Ser. No. 07,964,349 filed Oct. 21, 1992 entitled "Oil-Operated Tensioner".

*Primary Examiner*—Ramon S. Britts
*Assistant Examiner*—Roger J. Schoeppel
*Attorney, Agent, or Firm*—Howson & Howson

[57] ABSTRACT

In an oil-operated tensioner having a cylindrical housing and a plunger defining a high-pressure oil chamber, air is prevented from entering the high-pressure chamber, as the plunger moves in the outward direction, by oil in an annular chamber formed in the interior wall of the housing and surrounding the plunger. The annular recess can be formed at the end of the housing, if the housing is disposed so that the plunger projects outwardly in the upward direction. Otherwise, the annular chamber is disposed inwardly from the end of the housing.

1 Claim, 3 Drawing Sheets

OIL-OPERATED TENSIONER WITH OIL-SEALED AIR ENTRANCE

BRIEF SUMMARY OF THE INVENTION

This invention relates to tensioners and more particularly to improvements in an oil-operated tensioner used to apply tension to a driving chain, for example the chain used to drive the valve-operating camshaft from the crankshaft in an internal combustion engine.

In a typical oil-operated tensioner, a plunger, slidable in a tensioner housing, is urged against a pivoted shoe by the force of a spring within the housing, supplemented by the force exerted on the plunger by the pressure of oil within the housing. Pressure is applied to the oil in the housing by an oil pump driven by the engine. During the starting of the engine, the hydraulic pressure within the housing is low. Therefore, when the plunger moves forward under the action of the spring, air can enter the high-pressure chamber through a clearance between the plunger and the wall of the housing. The entry of air into the high pressure chamber can impair the function of the tensioner because the compressibility of the air can allow excessive retracting movement of the plunger when the tension in the chain increases.

The interposition of an O-ring between the wall of the housing and the plunger can prevent the entry of air, but the use of an O-ring introduces friction which impairs the operating performance of the plunger.

The principal object of this invention is to provide an improved oil-operated tensioner in which entry of air into the high-pressure chamber of the tensioner is prevented. It is also an object of the invention to provide for continuous proper operation of the tensioner even when oil pressure is low or non-existent. A still further object of the invention is to provide an oil-operated tensioner in which the entry of air into the high-pressure chamber is provided by an oil seal which uses the same oil as is used in the high-pressure chamber. Still another object of the invention is to prevent the entry of air into the high-pressure chamber of an oil-operated tensioner by means of a seal which is not subject to the problems and adverse effects encountered in the use of O-ring type seals.

In accordance with the invention, the above objects are addressed in an oil-operated tensioner by forming an annular oil chamber surrounding the plunger, preferably in the surface of the interior of the housing on which the plunger slides. More specifically, the oil-operated tensioner in accordance with the invention comprises: a cylindrical housing having a cylindrical interior surface; a plunger conforming to said cylindrical interior surface and slidable thereon, said plunger forming, with the housing, a high-pressure fluid chamber inside the housing; spring means for moving said plunger outward in relation to said housing; means providing a passage for supplying said high-pressure fluid chamber with oil; check valve means in said passage for allowing oil to flow freely into said high pressure fluid chamber but preventing flow of oil outward from said fluid chamber through said passage; and an annular oil chamber surrounding a portion of the plunger and forming a seal between the plunger and the cylindrical interior surface, whereby oil in the annular oil chamber prevents the entry of air into the high-pressure chamber as the plunger moves in the outward direction. In the preferred embodiments of the invention, the annular oil chamber is formed in the cylindrical interior surface of said housing.

When sufficient hydraulic pressure is present in the high-pressure chamber, the oil in the high-pressure chamber gradually leaks out through the clearance between the housing and the plunger. An oil film is formed between the housing and the plunger, and oil is allowed to accumulate in the annular oil chamber.

In a conventional oil-operated tensioner, various conditions can occur under in which the supply of oil to the tensioner is diminished or discontinued. For example, it is possible that no oil is present, or that insufficient oil is supplied at the time the engine is cranked during starting. If the plunger moves outward when the supply of oil is diminished or discontinued, air is likely to enter the high-pressure chamber from the outside through the clearance between the housing and the plunger. Although a small amount of oil will ordinarily remain to form an oil film between the housing and the plunger, this small amount of oil is frequently not enough to prevent the entry of air into the high-pressure chamber as a result of the volumetric change which occurs as the high-pressure chamber expands.

In the tensioner of this invention, an annular oil chamber between the housing and the plunger serves as a reservoir for tensioner-operating oil which seals the route for entry of air into the high-pressure chamber. As the plunger moves outward under a condition of low oil pressure or insufficient oil supply, oil from the annular oil chamber is drawn into the high-pressure chamber, and suction of air into the high-pressure chamber is thereby prevented.

Further objects, advantages and details of the invention will become apparent from the following detailed description, when read in conjunction with the drawings.

DETAILED DESCRIPTION

Figure 4:
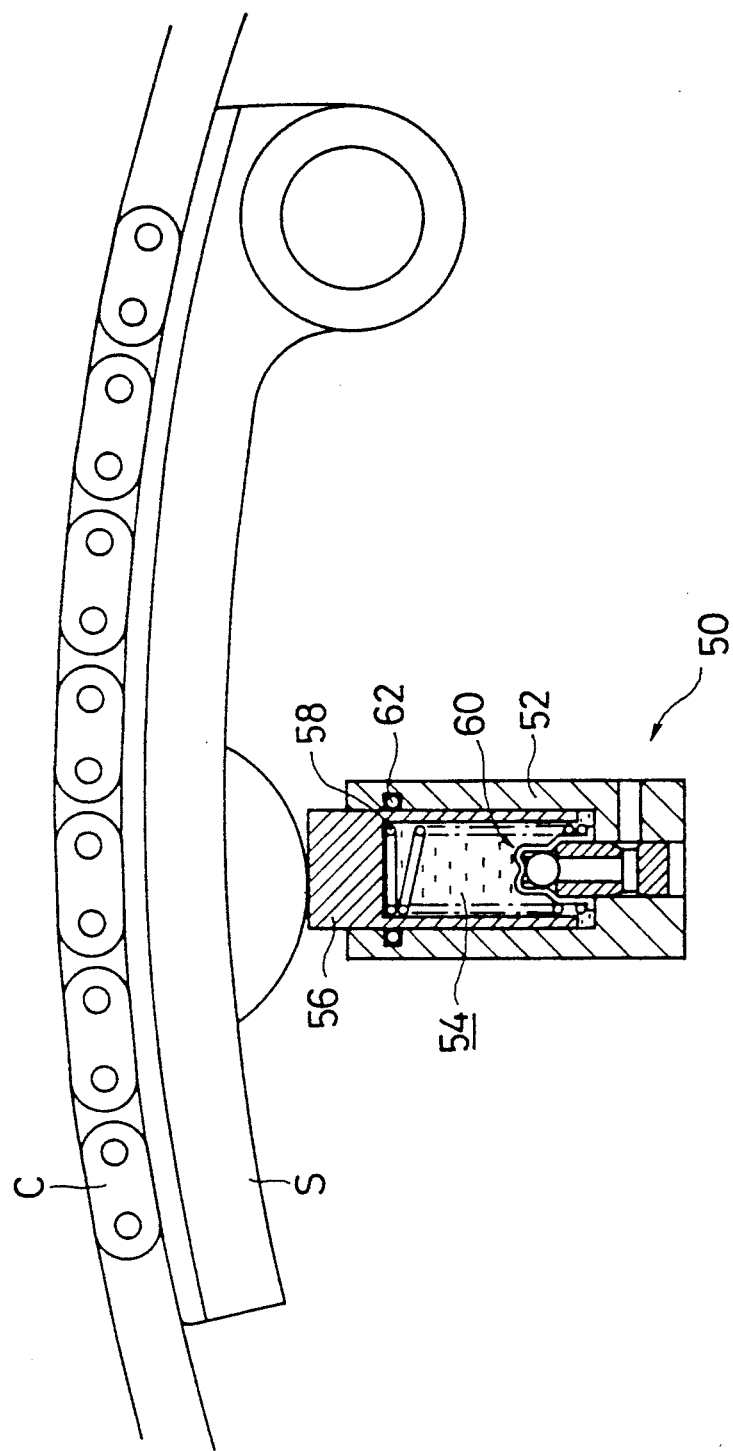
FIG. 4 is an elevational view of a tensioner assembly showing, in axial section, a conventional oil-operated tensioner.

A conventional oil-operated tensioner 50, as shown in FIG. 4, has a cylindrical housing 52, a hollow plunger 56 slidable in the housing, and a high-pressure chamber 54 inside the housing, bounded in part by the projecting end of the plunger, and the cylindrical side wall of the plunger, and in part by the back wall and cylindrical interior walls of the cylinder. A coiled compression spring 58, situated inside the interior of the hollow plunger 56, bears against the closed end of the interior of the plunger and against the back wall of the cylinder to urge the plunger in the outward direction in relation to housing 52. Oil is supplied to high-pressure chamber 54 via a check valve 60. An O-ring 62, located in a groove in the interior wall of the housing, bears against the exterior surface of the plunger to provide a seal. Plunger 56 imparts tension to a driving chain C through a tensioner shoe S.

Pressure is applied to the oil in the housing by an oil pump (not shown) driven by the engine. During the starting of the engine, the hydraulic pressure within high pressure chamber 54 is low. Therefore, when plunger 56 moves forward under the action of spring 58, air can enter high-pressure chamber 54 through the clearance between the plunger and the wall of housing 52. The entry of air into the high pressure chamber would impair the function of the tensioner because the compressibility of the air would allow excessive retracting movement of the plunger when the tension in chain C increases. O-ring 62, interposed between the wall of the housing and the plunger, prevents the entry of air, but introduces friction which impairs the operating performance of the plunger.

Figure 1:
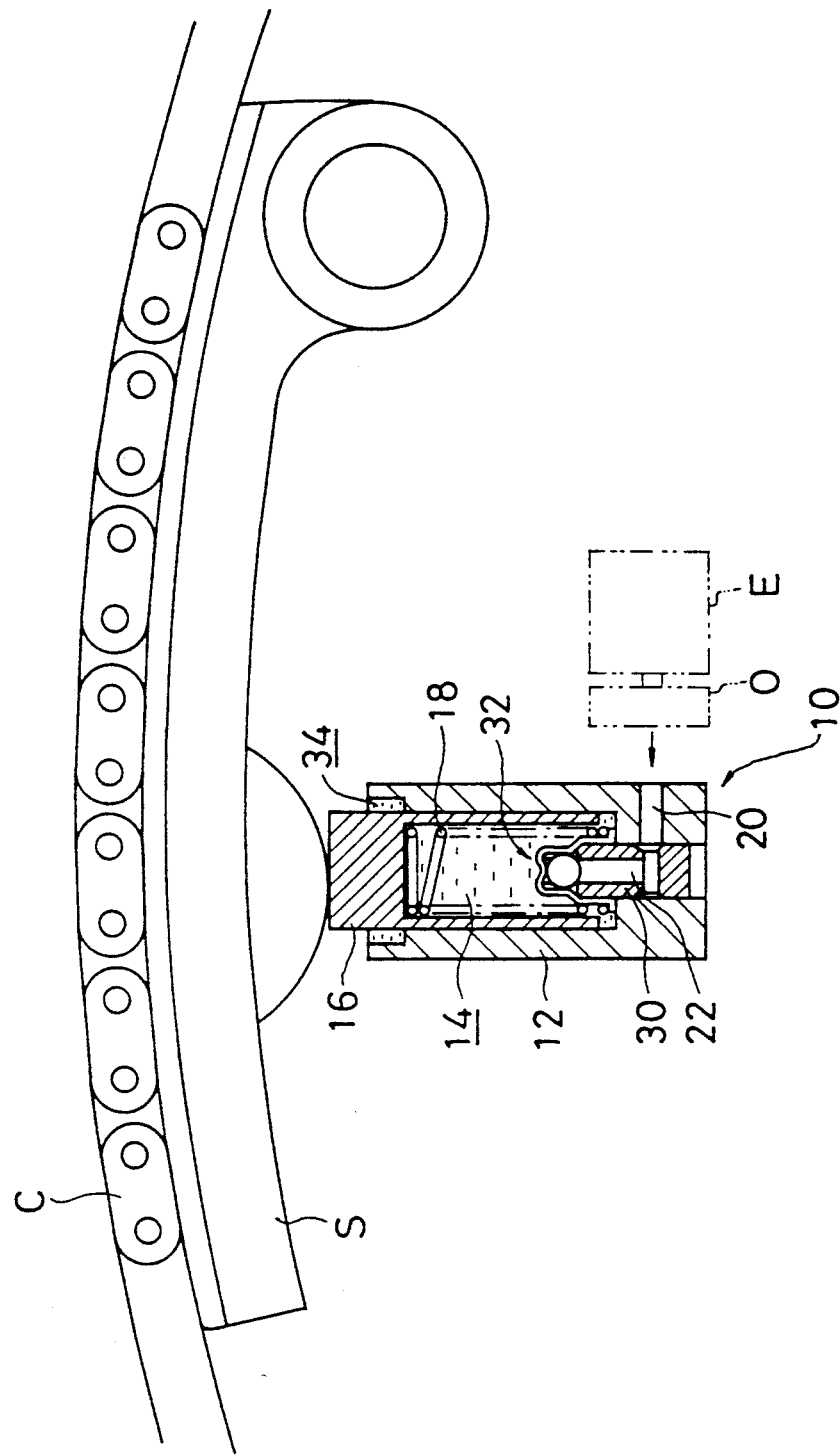
FIG. 1 is an elevational view of a tensioner assembly showing in axial section, an oil-operated tensioner according to a first embodiment of the invention.

In FIG. 1, a tensioner 10, in accordance with the invention, comprises a cylindrical housing 12 and a hollow plunger 16 slidable in housing 12. A high-pressure chamber 14 is formed inside the housing and is bounded by the front end of plunger 16 and the side wall of the plunger, and in part by the interior cylindrical wall of the housing and the back end of the housing. A compression spring 18 is located within the interior of the hollow plunger for moving the plunger 16 outward in relation to the housing 12. An oil passage 20 is formed in the housing to receive oil supplied by an oil pump 0 driven by engine E. The oil is supplied to high-pressure chamber 14 through oil passage 20 and a passage 22 in valve seat 30, which is part of a check valve 32. The check valve allows rapid flow of oil into chamber 14, but prevents flow of oil outward from the chamber through passage 22.

Plunger 16 applies tension to chain C through tensioner shoe S, which is pivotally supported at one end on an engine block. Tension in the chain is produced by spring 18 and the hydraulic pressure of the oil supplied to chamber 14 through passage 20.

Tensioner 10 has an annular oil chamber 34 defined by an annular recess formed on the forward end of housing 12. Annular oil chamber 34 serves as an oil reservoir, which holds oil dripping from chain C and oil leaking from the high-pressure chamber 14 past plunger 16. Since annular oil chamber 34 is located on the forward end of housing 12 and is open, it is necessary for the tensioner 10 to be positioned so that plunger 16 projects outwardly in the upward direction.

Figure 2:
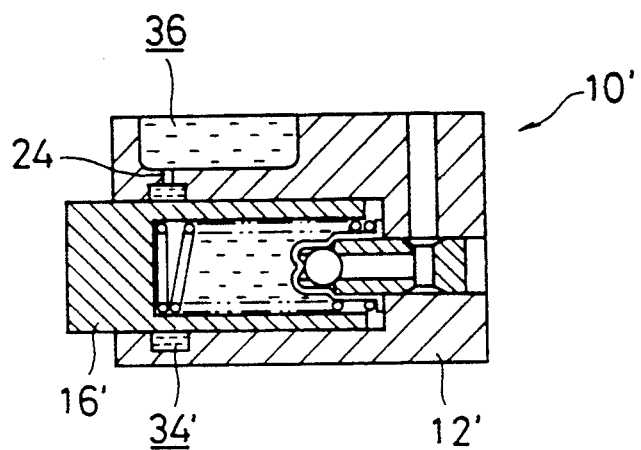
FIG. 2 is an axial section of an oil-operated tensioner according to a second embodiment of the invention.

FIG. 2 shows a second embodiment of the invention, which is suitable for use where a tensioner is disposed horizontally. The tensioner 10' comprises a housing 12' having an annular oil chamber 34' formed in the interior surface of a horizontally disposed cylinder in which a plunger 16' slides. An upwardly open oil reservoir 36 is formed in the upper part of housing 12'. The reservoir 36 and the annular oil chamber 34' are connected by an oil passage 24, through which oil is supplied constantly to the annular oil chamber 34'. Oil dripping from the chain can be caught by the open reservoir.

Figure 3:
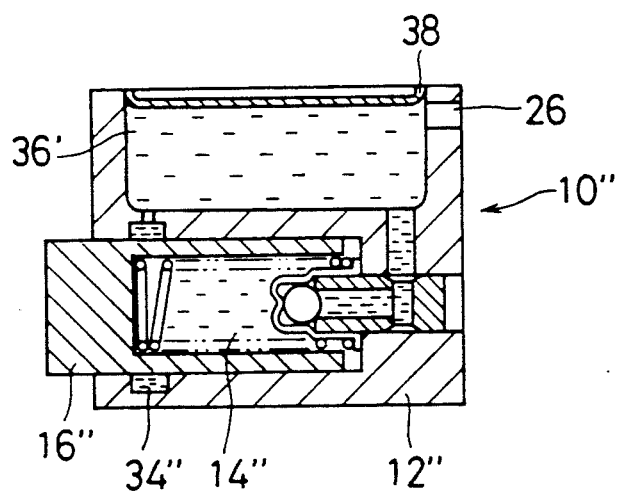
FIG. 3 is an axial section of an oil-operated tensioner according to a third embodiment of the invention.

FIG. 3 shows a third embodiment of the invention, which is usable with the tensioner disposed horizontally, vertically or in other directions. A housing 12" has an annular oil chamber 34" formed in the interior surface of a cylinder in which a plunger 16" slides. A reservoir 36', in the upper part of the housing, is provided with a cover 38, which is fixedly installed in an opening of the reservoir. An oil passage 26 is provided for supplying oil to the reservoir 36' from an oil supply source (not shown), such as an oil pump. Oil is supplied, through the reservoir 36', to the high-pressure chamber 14" and to the annular oil chamber 34".

The provision of an annular oil chamber in the surface of the housing in which the plunger slides prevents the entry of air into the high-pressure chamber. Consequently, proper tensioner operation is maintained even if the plunger moves outward when the oil pressure in the high-pressure chamber is low or non-existent.

The oil in the annular oil chamber is the same as the oil used for operating the tensioner. Therefore even if oil flows into the high-pressure chamber from the annular oil chamber, no adverse effects will result.

Finally, the annular oil chamber provides effective sealing against the entry of air into the high pressure chamber without the need for an O-ring or packing material, and consequently there is no impairment of the operation of the tensioner by friction, and no need for replacement of worn rings or packing material.

Various modifications can be made to the embodiments described. For example, as the supply of hydraulic pressure from an external hydraulic pressure source is not an essential prerequisite of the invention, it is possible to take advantage of the invention in a self-contained tensioner in which all of the operating oil is derived from a reservoir which is part of the tensioner.

In another modification, instead of forming the annular oil chamber on the inner peripheral surface of the cylinder of the housing at the forward end, the outer peripheral surface of the plunger, at its forward end, can be stepped down to form the annular oil chamber between the plunger and the inner peripheral surface of the housing.

These and other modifications can be made to the embodiments disclosed without departing from the scope of the invention as defined in the following claims.

I claim:

1. An oil-operated tensioner having a cylindrical housing, said housing having a cylindrical interior surface having an axis; a plunger having a cylindrical outer surface conforming to said cylindrical interior surface and slidable axially thereon through a range of axial movement, said plunger forming, with the housing, a high-pressure fluid chamber inside the housing; spring means for moving said plunger outward in relation to said housing; means providing a passage for supplying said high-pressure fluid chamber with oil; and check valve means in said passage for allowing oil to flow freely into said high pressure fluid chamber but preventing flow of oil outward from said fluid chamber through said passage; wherein the improvement comprises means providing an annular recess in said cylindrical interior surface of the housing, said recess being located at an axial position such that it is always in register with a portion of said cylindrical outer surface of the plunger throughout the range of axial movement of the plunger, said recess containing oil and forming a seal between the plunger and said cylindrical interior surface, whereby oil in said annular oil chamber prevents the entry of air into said high-pressure chamber as the plunger moves in the outward direction.

* * * * *